United States Patent [19]

Bergamaschi

[11] Patent Number: 5,606,582
[45] Date of Patent: Feb. 25, 1997

[54] DEVICE FOR THE AUTOMATIC DISCONNECTION OF A CONTROL ROD AND A NUCLEAR REACTOR ABSORBER CLUSTER

[75] Inventor: Yves Bergamaschi, Aix en Provence, France

[73] Assignee: Commissariat a l'Engergie Atomique, Paris, France

[21] Appl. No.: 669,587

[22] Filed: Jun. 24, 1996

[30] Foreign Application Priority Data

Jul. 12, 1995 [FR] France ................... 95 08438

[51] Int. Cl.⁶ .................................................. G21C 7/12
[52] U.S. Cl. .......................................... 376/233; 376/336
[58] Field of Search ................... 376/233, 228, 376/336

[56] References Cited

U.S. PATENT DOCUMENTS

| | | | |
|---|---|---|---|
| 3,715,269 | 2/1973 | Mehren | 376/233 |
| 3,733,251 | 5/1973 | Gilbertson et al. | 376/233 |
| 3,905,634 | 9/1975 | Johnson et al. | 376/233 |
| 4,713,210 | 12/1987 | Germer . | |
| 4,734,252 | 3/1988 | Bilibin | 376/336 |
| 5,051,229 | 9/1991 | Ford et al. | 376/336 |

FOREIGN PATENT DOCUMENTS

| | | |
|---|---|---|
| 0188163A1 | 7/1986 | European Pat. Off. . |
| 2261595 | 9/1975 | France . |
| 4212284A1 | 10/1993 | Germany . |

OTHER PUBLICATIONS

Patent Abstract of Japan, No. JP 5215883, vol. 017, No. 654 (P-1653), Dec. 3, 1993.
Patent Abstract of Japan, No. 6242277, vol. 018, No. 627 (P-1834), Nov. 29, 1994.
Patent Abstract of Japan, No. JP 4320994, vol. 017, No. 153 (P-1510), Mar. 25, 1993.

*Primary Examiner*—Harvey E. Behrend
*Attorney, Agent, or Firm*—Pearne, Gordon, McCoy & Granger

[57] ABSTRACT

The device makes it possible to automatically disconnect an absorber fuel rod cluster (6) from its control rod (5) when the pressure and/or temperature within the vessel of the reactor have dropped below a certain value.

Use is mainly made of a thermal module (35) located between the attachment head (37) and the locking member (32) in order to form a mobile assembly optionally completed by a barometric module placed beneath the locking member (32).

Application to pressurized water nuclear reactors.

6 Claims, 6 Drawing Sheets

DEVICE FOR THE AUTOMATIC DISCONNECTION OF A CONTROL ROD AND A NUCLEAR REACTOR ABSORBER CLUSTER

FIELD OF THE INVENTION

The present invention relates to a disconnection device between a means for absorbing neutrons in the core of a pressurized nuclear reactor and a control rod for the same, disconnection taking place automatically during the phase leading the reactor to its cold shutdown state.

The invention has a particularly important application in pressurized water reactors, by making it possible to reduce the duration of the core reloading operations and the like, as well as the exposure doses of personnel to radiation in this connection.

PRIOR ART AND SET PROBLEMS

For the control of pressurized water reactors, use is presently made of fuel rod clusters having an absorbing power with respect to neutrons and placed vertically in the reactor core, between the fuel elements, which, when grouped, is called a "fuel assembly", so as to regulate the reactivity of said core and therefore the power supplied by the reactor. These means are referred to as "absorber clusters" within the present application.

The displacement of each of the absorber clusters respectively attached to a control rod is obtained by displacement mechanisms, e.g. of the screw-nut type, cooperating with the control rod and placed within tight tubular enclosures linked with the reactor vessel and arranged vertically above the reactor vessel sealing cover.

The lower portion of the control rod is terminated by linking means, which engage in a gripping pommel of the absorber cluster and which can be remotely manually unlocked with the aid of a special tool, once the vessel sealing cover has been removed.

The operation of a nuclear reactor requires the periodic replacement of the fuel assemblies of the core.

Such an operation requires the removal of the sealing cover from the vessel, together with the control rod drive mechanisms carried by the same. Following the removal of the vessel cover, the control rods are manually disconnected individually from their respective absorber clusters with the aid of the special tool. The internal equipments of the reactor placed above the core are then removed at the same time as the group of control rods, the rods being raised by internal equipments.

The fuel assemblies are then uncovered and can be removed from the reactor core. Obviously, the reactor is shutdown during the core reloading operations and the maintenance in said state and which is referred to as the "cold shutdown state", so that the absorber clusters must remain fully within the fuel assemblies in order to satisfy safety standards.

The manual manipulation of each of the links, in order to disconnect the control rod from its associated absorber cluster, takes a relatively long time. Thus, the total duration of the manual disconnection operations is relatively long and during said time personnel is exposed to radiation.

U.S. Pat. No. 2,261,595 discloses a linking device between a control rod or bar and its associated absorber cluster. This device permits disconnection prior to the removal of the sealing cover from the vessel making use of the displacement mechanism of the control rod. Disconnection and reconnection are carried out by lowering and then raising the control rod, whilst the absorber cluster is completely inserted in the fuel assembly.

Such a device has the advantage of avoiding manual disconnection of the links following the opening of the vessel and therefore reduces the time taken for the core reloading operations and reduces the radiation exposure dose for personnel.

However, the means for coupling the control rod base remain engaged in the absorber cluster gripping member, when they are in the inoperative position. Thus, it is necessary to fear the accidental raising of one or more absorber clusters during the removal of internal equipments covering the core if, in conventional manner, said equipments are above the control rods. This may e.g. be due to an alignment deficiency between the base of the control rods and the gripping member of their associated absorber cluster, producing an attachment or fastening between said elements. Such an event can produce a rise in the core reactivity, which can be completely incompatible with the safety criteria which provide for the maintenance of the absorber clusters in the fuel assemblies when the reactor vessel is open. Moreover, there is no system for disconnecting the link between the control rod and the absorber cluster in the case of the jamming of the device when the coupling means are in the operative position.

German patent 42 12284 discloses a thermal control device automatically ensuring the uncoupling of a control rod from its associated absorber cluster and the propulsion in the core of said cluster in the case of an abnormal temperature rise within the reactor.

This device has coupling means of the ball type maintained in the operative position by a bolt connected to a thermal expansion module constituted by one or more metal bellows and ancillary tanks communicating with one another and filled with primary fluid. The increase in the length of the bellows under the effect of the expansion of the fluid trapped in the expansion module displaces the bolt in such a way as to firstly authorize the disconnection and then pushes back the absorber cluster.

However, such a device which has the advantage of requiring no external manipulation, only ensures the disconnection and propulsion into the core of the absorber cluster. The position of the bolt which conditions the putting into the inoperative or operative state of the coupling means is directly dependent on the temperature of the reactor and in fact the temperature of the expansion module.

AIMS OF THE INVENTION

The aim of the invention is to equip the link between the control rod and its associated absorber cluster with a device making it possible to automatically separate the rod from the cluster during the bringing of the reactor into the cold shutdown state prior to the removal of the vessel sealing cover in order to eliminate, without any external intervention and without encountering the difficulties which arise with the invention of U.S. Pat. No. 2,261,595, the manual manipulation in conventional form of the joints and consequently the reduction of the duration of the operations performed when the vessel is opened, whilst reducing the radiation exposure doses for personnel.

The aim of the invention is also to give said same link between the control rod and the absorber cluster an automatic separating device, which can be neutralized, unlike that of German patent 42 12 284. The neutralization of the automatic separation makes it possible to avoid on the one hand the needless uncoupling if the reactor is brought into the cold shutdown state for a reason other than an opening of the vessel and on the other the capacity to recouple, e.g. as in the prior art, during the cold shutdown prior to the sealing of the vessel and the reactor power rise.

SUMMARY OF THE INVENTION

To this end, the main object of the invention is an automatic uncoupling device between the pommel of an absorber cluster intended to be introduced between the fuel elements of the core of a pressurized water nuclear reactor and a control rod transmitting to the absorber cluster movements induced by a control mechanism located in a tight enclosure placed above the reactor vessel sealing cover, said uncoupling device incorporating an attachment head and a mobile locking member, able to occupy a locked state and an unlocked state, whereof an axial displacement leads to a change of state, characterized in that it also comprises a thermal module axially deforming under the effect of the temperature and which is positioned between the attachment head and the locking member to form an axially mobile assembly.

In a preferred embodiment of the invention, the thermal module comprises a water-filled, tight bellows.

The attachment head comprises at least one radial attachment finger projecting as a result of a small spring and sliding within a cylinder fitted into the cladding or shell of the control rod, said cylinder having in an inner portion and from top to bottom, in order to receive the attachment finger a chamfered widening and an axial notch, having a U-shaped cross-section, machined over a portion of its height. Above the attachment head is located a second spring, which pushes it permanently downwards.

The locking member is a sliding cylindrical member coaxially mounted in the control rod cladding, said locking member having an annular locking groove which can be positioned in front of the balls, located in the control rod cladding, when the locking member is in a high position. The balls are received in radial, truncated cone-shaped cavities, located at the bottom of the cladding and whose thickness is less than the diameter of the balls, said cavities being shaped so as to prevent a radial, outwardly directed escape of the balls.

An extractor tube is mounted in sliding manner on the lower end of the cladding and is pushed downwards by a third spring sufficiently stiff to raise the control rod. This extractor tube has in its upper portion a slot having an axial portion followed by a helical portion and which, by sliding on a guide pin integral with the cylinder, guides the displacement of the latter.

Level with the guide pin, the control rod cladding has a horizontal slot allowing the rotation by a fraction of a turn of the cylinder with respect to the control rod, thus permitting the freeing of the attachment finger from the U-shaped, inner notch and, consequently, the free displacement of the attachment head in the downwards direction.

The automatic uncoupling of the absorber cluster with respect to the control rod, controlled by the device according to the invention, occurs in the case of a drop in the temperature of the reactor vessel water below a certain threshold (e.g. approximately 80° C.). The attachment finger then abuts in the U-shaped axial notch and the locking member rises under the effect of the shortening of the bellows, due to the contraction of the water, up to its upper position, which permits the radial engagement of the balls in the annular groove of the locking member.

In this uncoupled position, when a pressure is exerted from the top on the control rod, the latter is firstly displaced downwards by a height equal to that of the axial portion of the cylinder slot and then, under the action of the helical portion of the slot on the guide pin, rotates the cylinder by a fraction of a turn disengagement the attachment finger from the U-shaped notch, thus permitting a downward displacement of the attachment head-thermal module-locking member assembly and consequently the recoupling of the control rod with the pommel of the absorber cluster.

In a constructional variant, it is possible to complete the device with a barometric module positioned below the lower end of the locking member, which is then subdivided into two sections, which are interconnected by a fourth spring, whose displacement is limited by a guide and stop pin-axial slot system, said barometric module, kept under a vacuum, axially deforming as a function of the pressure variations prevailing in the reactor core giving rise to a change of state of the locking member.

The barometric module is preferably constituted by a lower base surmounted by an axial bush, an upper cap covering the axial bush, a metal bellows tightly connecting the bush and the cap and a fifth spring placed within the bush.

In this constructional variant, the automatic uncoupling is obtained on the one hand when the pressure within the reactor vessel is sufficiently reduced and on the other when the temperature within the vessel is sufficiently lowered.

LIST OF DRAWINGS

The invention and its various technical features will be better understood from a study of the following drawings, wherein show:

FIG. 1 A sectional view of the upper portion of a reactor vessel where the invention is installed.

FIG. 2 A sectional view of the device according to the invention in two parts.

FIG. 3 A part front view of the notch permitting the rotation of the cylinder in order to retract the abutment in the device according to the invention.

FIG. 3A A horizontal section along line A—A of FIG. 3.

FIG. 3B A horizontal section along B—B of FIG. 3.

FIG. 4 In section, the lower portion of the device according to the invention.

FIGS. 5A to 5D Four simplified sectional views of the device according to the invention during four operating phases.

FIG. 6 A frontal section of a variant of the device according to the invention.

DETAILED DESCRIPTION OF AN EMBODIMENT OF THE INVENTION

Figure 1:
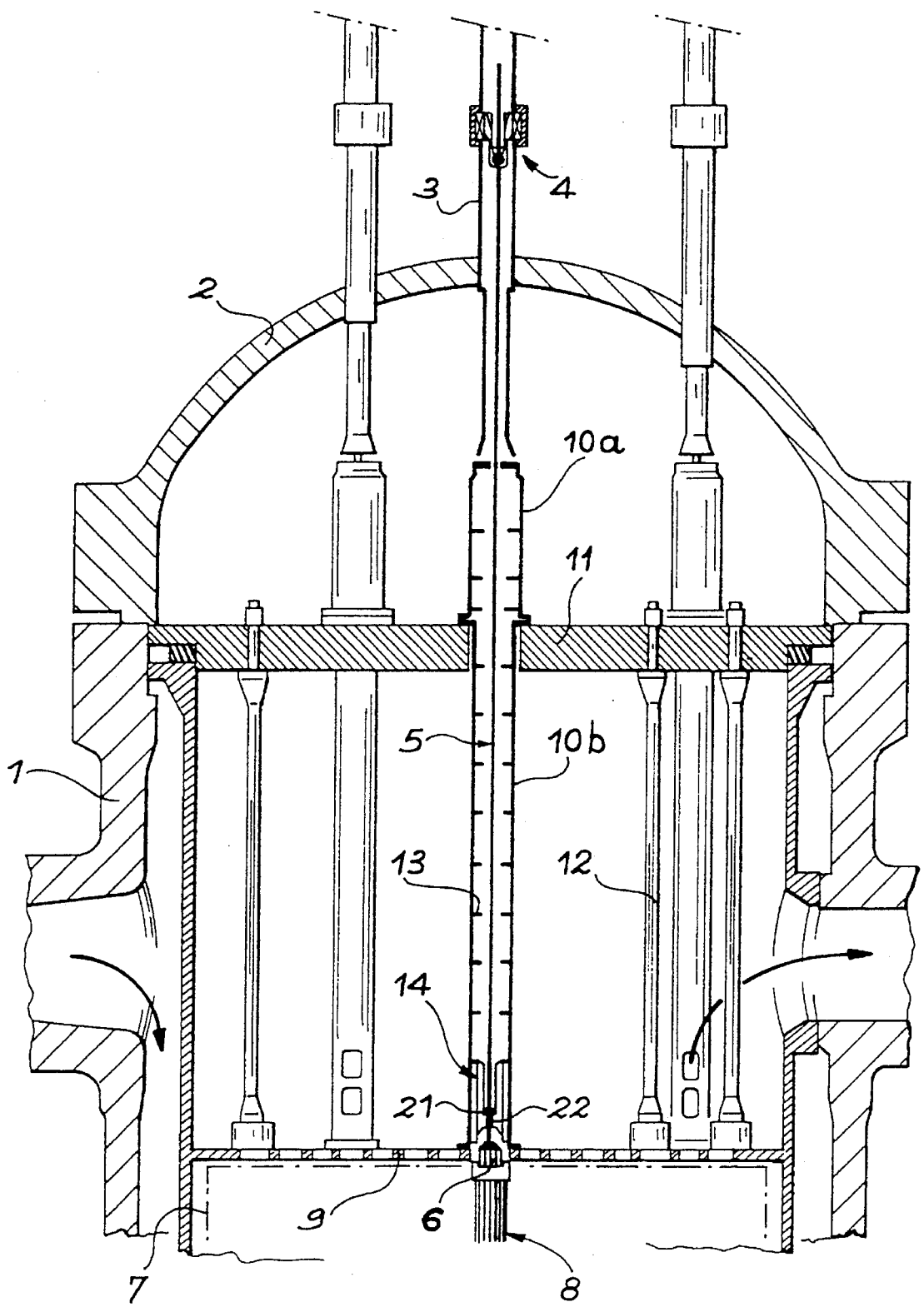

FIG. 1 shows in front view the vessel 1 of a pressurized water nuclear reactor, sealed in its upper portion by a hemispherical cover 2 supporting tight enclosures 3. Within each of the tight enclosures 3 is placed a mechanism 4 permitting the displacement of a control rod 5 of an absorber fuel rod cluster 6. This mechanism is preferably of the screw-nut type with a separable screw. The absorber rod cluster 6 is placed in the lower portion of the control rod 5 in suspended manner. The fuel rods have a neutron absorbing power.

The core of the reactor 7 is constituted by a juxtaposed fuel assembly system 8. The upper limit of the core 7, just above said fuel assemblies 8, is defined by a core plate 9. The regulation of the reactivity of the core 7 is consequently ensured by introducing to a more or less deep extent the absorber clusters 6, into certain of the fuel assemblies 8 of the core 7.

Above the core 7, the absorber clusters 6 slide within cases referred to as "cluster guides" constituted by two superimposed elements 10a, 10b vertically suspended on an upper support plate 11 attached to the vessel and connected to the core plate 9 by fixing posts 12. These equipments located above the core form a rigid assembly called "upper internal equipments".

Perforated transverse plates 13 are placed at different levels within the cluster guides 10b and ensure a discontinuous guidance of the different elements of the cluster. Another continuous guidance element 14 is installed in the lower portion of the lower cluster guide element 10b, in an area where the water passes radially out of the cluster guide in the direction of the vessel outflow tubes.

Figure 2:
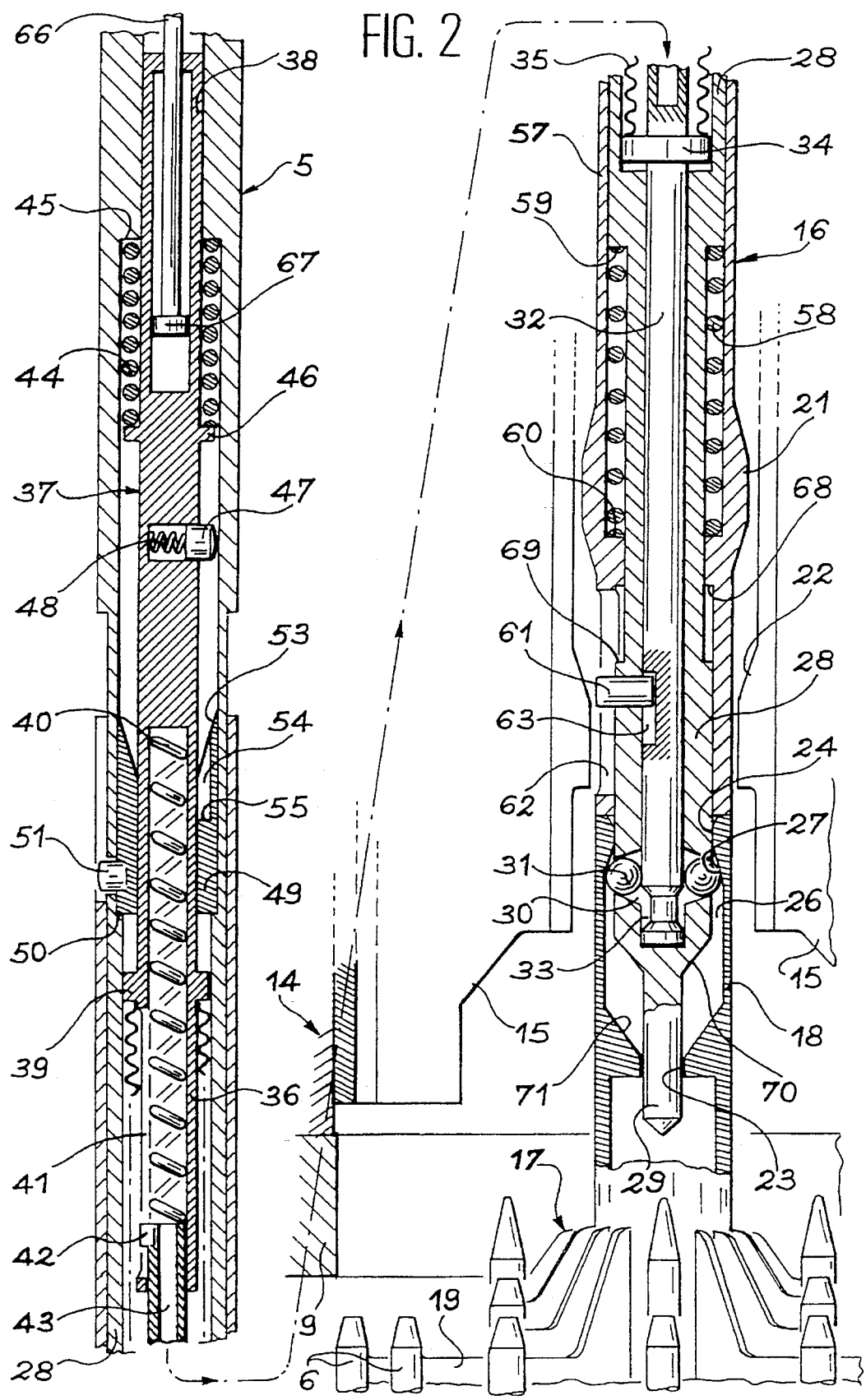
Figure 4:
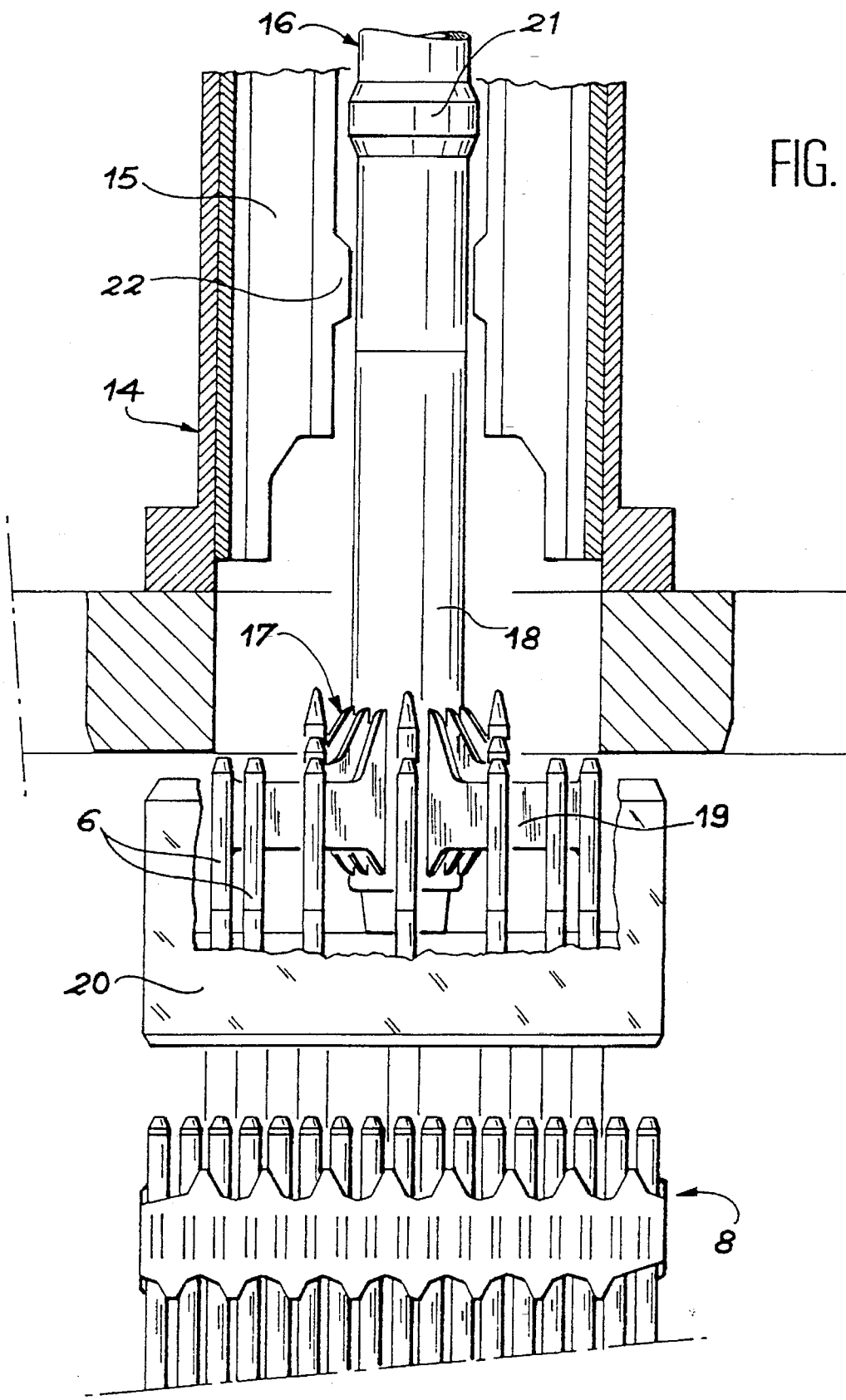

In the right-hand part of FIG. 2 and in particular FIG. 4, showing the lower portion of the device 16 according to the invention, it is possible to see on a larger scale the continuous guidance element 14 constituted by slotted sleeves 15 positioned in a vertical manner. The device 16 connects the control rod 5 to a fixing part 17 for the absorber clusters 6. The fixture is constituted by a pommel 18 for assembling with the control rod 5 and equipped with fuel rod-supporting, radial arms 19.

Core reloading or similar operations are performed in water, following the dismantling of the vessel sealing cover. During these operations, the temperature within the vessel must be kept below a certain level, e.g. 60° C., and the absorber clusters 6 must remain completely inserted within the fuel assemblies 8, not shown in FIG. 2, their pommel 18 resting on the upper end piece 20 of the fuel assembly 8.

A special tool for manipulating the device according to the invention can be stowed at the upper end of the control rod 5, once the vessel cover has been removed.

The control rods 5 are removed by raising upper internal equipments, once the control rods 5 are disconnected and disengaged from the pommel 18 of the associated absorber cluster. During this removal operation, the control rods 5 are raised by upper internal equipments, by means of a shoulder 21 which they have in the lower portion and which is driven by attachment teeth 22 provided on the continuous guidance sleeves 15.

The pommel 18 of the absorber cluster 6 has an opening 23 and a cylindrical recess 24 for receiving the lower end of the control rod 5. A cylindrical locking chamber 6 is machined within the recess 24. The upper portion of the locking chamber 26 is connected to the recess 24 by a conical contraction 27.

The control rod 5 is constituted by a cylindrical sheath 28, contracted in its lower portion over a certain height and then terminated by a solid shaft 29 penetrating the opening 23.

The sheath 28 of the control rod 5 is provided in the lower part of this contraction on the same axial side with a series of truncated cone-shaped radial notches 30 and whose base issues into the interior of the sheath 28. In the interior of each of these radial notches 30 is placed a ball 31, whose diameter exceeds the thickness of the sheath 28. Each ball 31 is mobile within its radial notch 30. The locking chamber 36 permits a disengagement of these balls 31 towards the outside of the control rod 5. The contracted portion of each of the radial notches 30 prevents a complete disengagement of each ball 31 in this sense.

A locking member 32 is installed in the lower part of the control rod 5. This locking member 32 is central and coaxial with respect to the control rod 5 and displaceable in accordance with its longitudinal and vertical axis. An annular locking groove 33 is machined in the bottom of the locking member 32, which extends beyond the contraction of the sheath 28 of the control rod 5 and has, above said contraction, a widening 34 tightly connected to the lower end of a metal bellows 35, deformable in accordance with the axis of the control rod 5.

According to a main feature of the invention, the top of the locking member 32 is engaged within an inner tube 36 terminated in its upper part by an attachment head 37 surmounted by a fastening 38. The tube 36 has a widening 39 tightly connected to the upper end of the bellows 35. A first spring 40 is placed within the inner tube 36 and tends to disengage the locking member 32 from the inner tube 36.

The inner tube 36 has a vertical recess 41 receiving a guide and stop pin 42 radially fixed to the upper end of the locking member 32. The recess 41 links the internal volume of the inner tube 36 with that of the bellows 35. These two volumes contain an incompressible or almost incompressible substance, whose volume varies with the temperature to a significant extent. With these conditions satisfied, this substance must be compatible with the neutron flux radiation and also, in the case of a sealing loss of the bellows 35, with the water of the reactor and the chemical elements therein and with advantage use can be made of demineralized water.

The attachment head 37, bellows 35 and locking member 32 constitute in this first embodiment a rigid, coaxial assembly able to slide within the control rod and whose length is consequently dependent on the temperature.

An opening 43 within the locking member 32 and linked with the interior of the bellows 35 can also be filled with water and constitutes an additional volume making it possible to achieve the desired deformation characteristics of the thermal module.

A second spring 44, interposed between a detachment 45 of the inner space of the control rod 5 and a projecting portion 46 of the attachment head 37, pushes towards the bottom said head. The stiffness of the second spring 44 is greater than that of the first spring 40. The attachment head 37 carries a finger 47 pushed back by a small spring 48. This attachment finger 47 is transversely mobile in order to project into the inner space of the control rod 5 or is partly or totally retracted into the inner space of a cylinder 49. The latter bears on a contraction 50 of the internal space of the control rod 5 and can turn by a fraction of a turn with respect thereto. The extent of this rotation is limited by the displacement of a radial guide and stop pin 51, integral with the cylinder 49 and in part engaged in a horizontal slot 52 made in the thickness of the sheath 28 of the control rod 5 over a circumferential sector of said sheath 28.

In its upper portion, the internal space of the cylinder 49 has a widening 53 issuing onto the internal space of the control rod 5. This internal space of the cylinder 49 also has an axial, vertical notch 54, whose cross-section is that of a capital U, as illustrated in FIG. 3B. The lower end of the notch 54 is sealed by a shoulder 55. Its upper end issues into the thickness of the cylinder 49 level with the widening 53 and its edges 56 are rounded.

An extractor tube 47 is mounted in sliding manner on the lower end of the control rod 5 and has a third internal spring 58 mounted on the contracted portion of the control rod 5 and interposed between the base of the contraction 59 and an internal surface 60 made within the extractor tube 57. This third spring 58 is prestressed in such a way as to produce a pressure on the control rod 5 which is at least adequate to raise it, the lower end of the extractor tube 57 being placed on the cluster pommel 18.

Another guide and stop pin 61 is radially fixed in the contracted portion of the sheath 28 of the control rod 5 and projects inwards and outwards of said sheath 28. The portion of said guide pin 61 passing outside the sheath 28 is engaged in a vertical slot 62 made in the thickness of the extractor tube 57 parallel to its axis. The other end of the guide and stop pin 61 is engaged in a vertical recess 63 formed in the locking member 32 along the axis of the latter.

Figure 3:
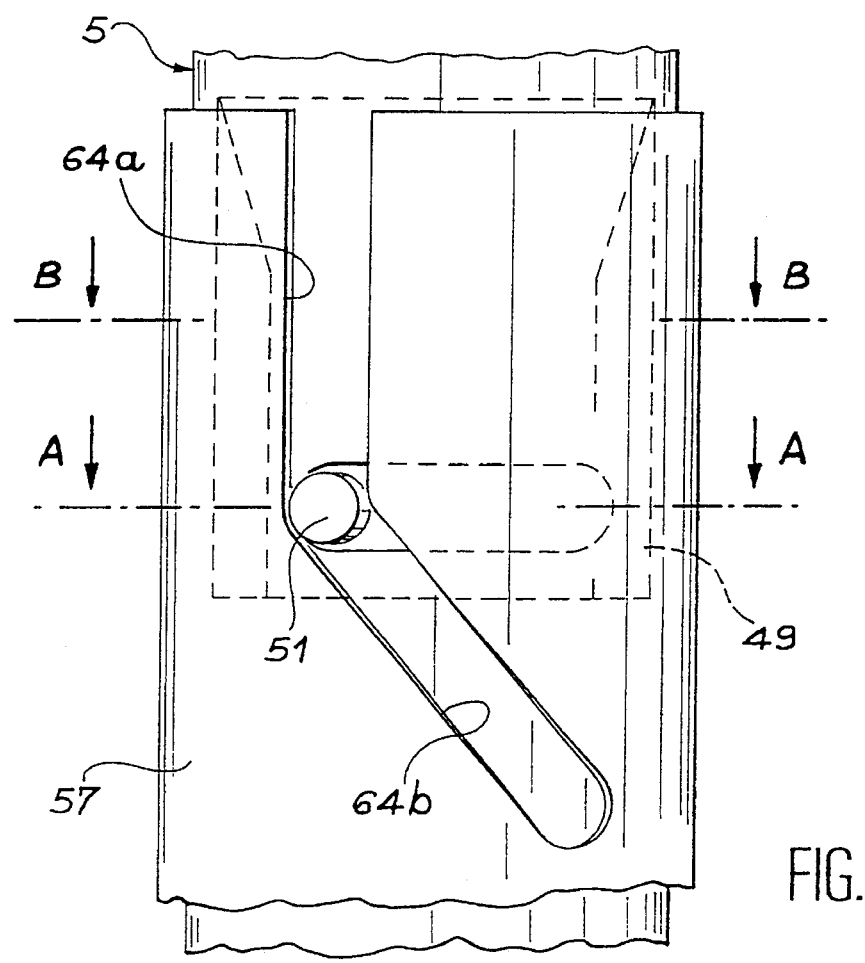
Figure 3A:
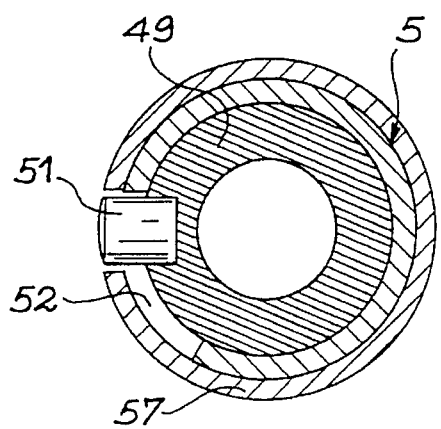
Figure 3B:
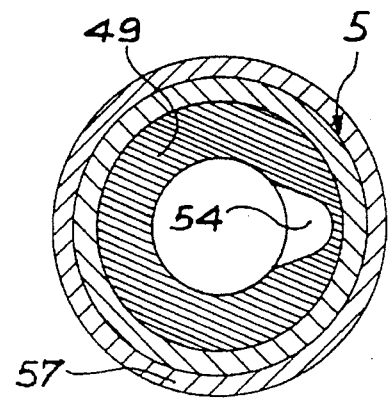

With reference to FIG. 3, the extractor tube 57 has a slot 64 constituted by a vertical branch 64a, oriented parallel to the tube axis and issuing onto a second branch, oriented parallel to the tube axis and issuing onto a second, inclined branch 64b in the form of a helix portion. The slot 64 is engaged on the radial pin 51, which is integral with the cylinder 49 and collaborates with the horizontal slot 52 of the control rod 5.

The horizontal slot 52 in the sheath 28 of the control rod 5 can be better seen in FIG. 4. It can be seen that it permits a rotation, whose extent is determined by its width for the cylinder 49 and the retraction of the abutment constituted by the shoulder 55 sealing the lower end of the notch 54.

The device is completed by a long dismantling rod 66, positioned axially and centrally in the control rod 5 and terminated in its lower portion by a boss 67, which penetrates a fastening 38 of the attachment head 37.

The dismantling rod 66 rises to the top of the control rod 5, where are located not shown, control means permitting the vertical actuation thereof and the fixed maintenance thereof in an axial position, where its terminal boss does not impede the displacements of the attachment head 37.

The control rod 5 comprises not shown means making it possible to stop the rotation of said rod, e.g. with respect to the continuous guide 14 installed in the lower cluster guide 10b. The control rod 5 also comprises not shown means making it possible to link in rotation said rod and the cluster pommel 18 once these elements have been engaged.

OPERATION OF THE DEVICE

Figure 5D:
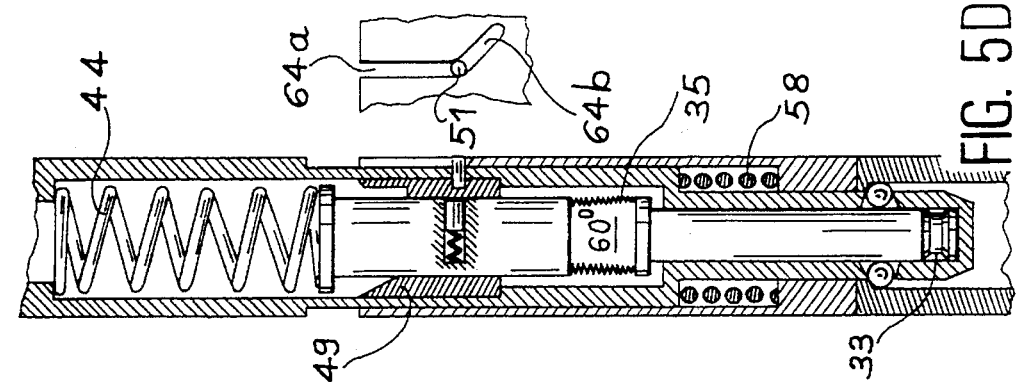
Figure 5C:
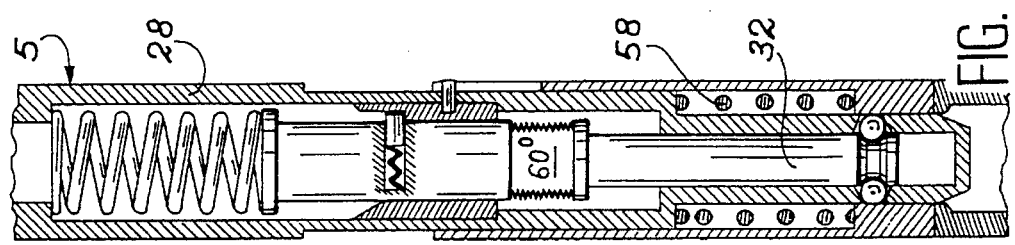
Figure 5B:
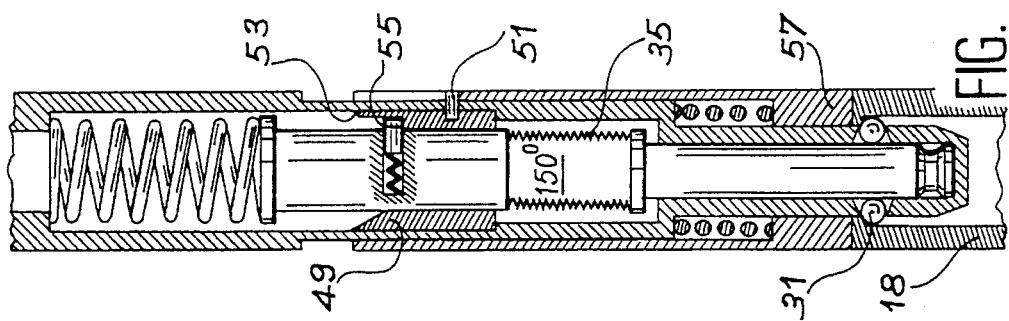
Figure 5A:
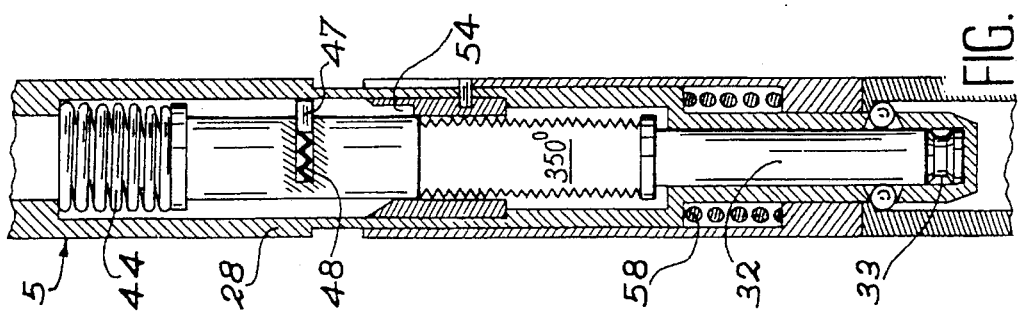

With reference to FIGS. 5A to 5D, the operation of the aforementioned device will now be explained. Consideration will be given to the case of a reactor during different phases between two core fuel resupplies. When the reactor is operating, i.e. at 350°, e.g. for producing electricity, the components of the device assume the position indicated in FIG. 2. FIG. 5A shows the main components of the device in this position.

The control rod 5 is coupled in translation to the absorber cluster 6. The locking member 32 is in the lower position and has in front of the balls 31 a solid part keeping them in the "out" position, i.e. partly engaged in the thickness of the sheath 28 of the control rod 5 and in the locking chamber 26 of the pommel 18 of the absorber cluster 6. The locking member 32 is maintained in the lower position under the effect of the pressure of the second spring 44. Its lower end abuts against the bottom of the contraction of the sheath 28 and the control rod 5. Thus, the balls 31 transmit to the pommel 18 of the absorber cluster 6 the axial forces exerted by mechanism 4 in FIG. 1 on the control rod 5.

The third spring 58 tends to permanently move apart the control rod 5 and the pommel of the absorber cluster 6 by pushing back the extractor tube 57. It therefore tends to maintain a permanent contact between the balls 31 and their recess 30 and the conical contraction 37 of the pommel 18. This avoids or renders acceptable any impacts between the balls 31 and the parts in question. Such impacts can e.g. result from vertical accelerations and decelerations transmitted to the control rod 5 by the mechanism during its operation and which are liable to produce a deterioration of the contacting surfaces.

The attachment finger 47, which is pushed back by the small spring 48, is in a position projecting from the attachment head 37 and its end abuts against the interior of the sheath 28 of the control rod 5.

In this position, a temperature rise or fall close to the device gives rise to a lengthening or shortening of the thermal module constituted by the water-filled bellows 35. These length changes are compensated by a crushing or an expansion of the second spring 44, the locking member 32 remaining in the lower position. They produce a rise or fall of the attachment head 37, the attachment finger 47 carried by the latter moving axially within the internal space of the sheath 28 of the control rod 5.

If the temperature is sufficiently lowered, the attachment finger 47 descends within the cylinder 49. At the end of penetration, the entrance chamfer 58 pushes back the attachment finger 47 within the attachment head 37, until it comes into an intermediate radial position authorizing its displacement within the notch 54 of the cylinder 49.

When a certain temperature is reached, e.g. 150° C., the attachment finger 47 can abut, as shown in FIG. 5B, against the shoulder 55, which seals the notch 54 of the cylinder 49.

If the temperature continues to drop, the attachment head 37 is stopped in its descent and the shortening of the thermal module, i.e. the bellows 35, is accompanied by a raising of the locking member 32. When a given temperature is reached, the groove 33 of the locking member 32 comes level with the balls 31 and allows the disconnection enabling said balls 31 to pass out of the locking chamber 26 of the pommel 18, in order to be placed in the "return" position within said groove 33. This disconnection temperature can e.g. be 80° C. for a vessel cover raising temperature below 60° C.

During uncoupling, the clusters 6 can e.g. be suspended on the control rods 5, the base of the pommels 18 being a few centimeters above the upper end piece 20 of the fuel assembly.

In this uncoupling position, the control rod 5 is disengaged from the pommel 18, which drops onto the upper end piece 20 of the fuel assembly under the combined effect of the weight of said cluster and the pressure of the third spring 38, to which it is exposed by means of the extractor tube 57.

During the descent of the pommel 18, the extractor tube 57 is pushed downwards by the third spring 58 and slides on the control rod 5 so as to take the position previously occupied by the pommel 18. This renders impossible, in redundant manner with the conical contraction of the recess 30 of the balls 31, the loss of said balls 31 when the latter have been disengaged from the pommel 18. This movement of the extractor tube 57 is stopped when a radial, inner surface 58 machined in the interior of said extractor tube 57, comes into contact with an external shoulder 69 of the control rod 5.

When the control rod 5 has become disengaged from the pommel 18 of the absorber cluster 6, the control rod is placed on the pommel 18 with the aid of mechanism 4 in FIG. 1. The position then assumed by the main components of the device and the cluster pommel is diagrammatically shown in FIG. 5C.

The extractor tube 57 abuts the pommel 18 of the absorber cluster 6, which rests on the upper end piece of the cluster. The third spring 58 then raises the control rod 5 and maintains the sheath 28 and solid shaft 29 of rod 5, which terminates it respectively out of the cylindrical recess 24 and out of the opening 23 of the pommel 18.

The deformation characteristics of the thermal module constituted by the bellows 35 and the geometry of the locking groove 26 are such that a temperature drop below the uncoupling temperature has no effect on the position of the balls 31.

Once the vessel cover has been raised, the control rods 5 are discharged at the same time as the upper internal equipments, the shoulder 21 bearing on the attachment teeth 22 of the continuous guide 14 in FIG. 1, when the upper internal equipments are raised.

The arrangement of the control rod 5 with respect to the pommel 18 of the absorber cluster 6, obtained by the device according to the invention, avoids the untimely raising of a cluster, during the retraction of the upper internal equipments.

Following core reloading, the upper internal equipments are put back into place at the same time as the control rods 5 and the latter are in a relative position, with respect to their respective pommel 18, identical to those which they had before cover removal and then that of the upper internal equipments. This position is indicated in FIG. 5C. The upper end of the control rods 5, in this position, extends beyond the cluster guide elements 10.

When it is necessary to recouple the control rods 5 and the absorber clusters 6, use is made of the device manipulating tool, which is engaged in the upper portion of each rod 5. In order to obtain its recoupling, the control rod 5 is lowered to a conical surface 70 connecting the lower end of its sheath 28 and its terminal shaft 29 abuts against the contraction 71 at the entrance of the opening 23 of the pommel 18. The descent takes place under the effect of the weight of the tool, which ensures that the equipment is not damaged by the application of an overload.

The descent of the control rod 5 passes the radial pin 51, connected to the inner cylinder 49, into the longitudinal portion 64a of the slot 64 of the extractor tube 56 and then, when the balls 31 pass the recess 24 of the pommel 18, into the helical portion 64b of said same slot. The displacement of the radial pin 51 in said helical portion 64b gives rise to the rotation by a fraction of a turn of the cylinder 49, which retracts the shoulder 55 of said cylinder and brings the attachment finger 47 into the complete retraction position within the attachment head 37 to which it is fixed.

This attachment head 37 is then freed and the assembly which it forms with the thermal module, i.e. the bellows 35, and the locking member 32 descends until the latter arrives in the lower position, under the effect of gravitational forces exerted on the different elements and the pressure of the second spring 44 applied to the attachment head 37.

The descent of the locking member 32 pushes the balls 31 towards the outside of their conical recess 30 in the sheath 28 and passes them out into the locking chamber 26 of the pommel 18.

When the force on the control rod 5 is slackened, the latter rises under the effect of the pressure of the third spring 58 until the balls 31 come into contact with the conical contraction 27. During this rise, the radial pin 51 passes into the helical portion 64b of the slot 64 and rotates the cylinder 49 until it is brought, when the longitudinal, vertical, portion 64a of the slot 64 is joined into a starting position where the notch 54 coincides with the trajectory of the attachment finger 47. Coupling is then implemented and the position assumed by the components of the device according to the invention is shown in FIG. 5D. The vessel cover can then be put back into place.

The special manipulating tool of the device can also be used for manually uncoupling the control rod 5 from the absorber cluster 6, in the case of a malfunctioning of the automatic disconnection system, e.g. in the case of a sealing loss of the bellows 35.

Therefore the device according to the invention is designed in such a way that, if the seal of the bellows 35 is broken, the locking member 32 is brought and/or immobilized in a bottom position. Thus, coupling is maintained when the reactor is cooled. This is obtained by means of the first spring 40 exerting a permanent downward pressure on the locking member 32 which, in the case of a rigidity loss of the thermal module, brings and/or maintains said member 32 in the bottom position.

Emergency manual uncoupling takes place by raising the dismantling rod 66 with the aid of the special tool, the control rod 55 being kept fixed by said same tool.

The rising of the dismantling rod 66 displaces the locking member 32 when a certain distance has been covered. The boss 67 terminating the dismantling rod 66 firstly raises the attachment head 37 engaging with its fastening 38 and then, if the bellows has fractured, the pin 42 of the locking member 32 abuts against the bottom of the recess 41 of the tube 36 of the attachment head 37, which raises the member 32. The latter is brought into the upper position, the lower end of the recess 63 thereof abutting against the pin 61 traversing the sheath 28 of the control rod 5. The groove 33 in the locking member 32 is then positioned in front of the balls 31, which allows uncoupling to take place.

Finally, with the aid of the tool, the control rod 5 is raised under the effect of the pressure of the third spring 58 until it is disengaged from the pommel 18 and the dismantling rod 66 is lowered into the inoperative position. The position assumed by the components of the device and the pommel 18 of the absorber cluster 6 is the same as after an automatic disconnection followed by a placing of the rod on the pommel (FIG. 5C).

The neutralization of the automatic uncoupling requires that the temperature is lowered below the locking temperature of the attachment head 37 by an abutment of the attachment finger 47 against the shoulder 55 of the inner cylinder 49. It is also necessary for the absorber cluster 6 to be brought into a position inserted in the fuel assembly, its pommel 18 resting on the upper end piece of the assembly.

With these conditions fulfilled, neutralization takes place by exerting a pressure on the control rod 5 with the aid of its displacement mechanism until its conical surface 70 is made to abut against the contraction 71 of the pommel 18.

The lowering of the control rod 5 causes, as in the manual recoupling operation with the aid of the special manipulating tool described hereinbefore, a complete return of the attachment finger 47 into the attachment head 37, which authorizes a lowering of the head 37 within the cylinder 49 and is accompanied by a lowering of the locking member 32 into its bottom position. Under these conditions, a subsequent temperature drop causes a descent of the attachment head 37, the locking member 32 remaining in the lower position. Thus, the automatic uncoupling is neutralized and the internal components of the device according to the invention assume, for the same temperature, the position shown in FIG. 5D.

Automatic uncoupling is again obtained after an adequate temperature rise to bring the attachment finger 47 above the shoulder 55 of the cylinder 49.

Finally, if the temperature has been brought beyond the uncoupling temperature without neutralization of automatic uncoupling, it is possible to recouple without having to open the vessel cover. This recoupling takes place with the aid of the displacement mechanism, the procedure being the same as when this operation is performed with the aid of the special manipulating tool.

PROPOSED VARIANT

Figure 6:
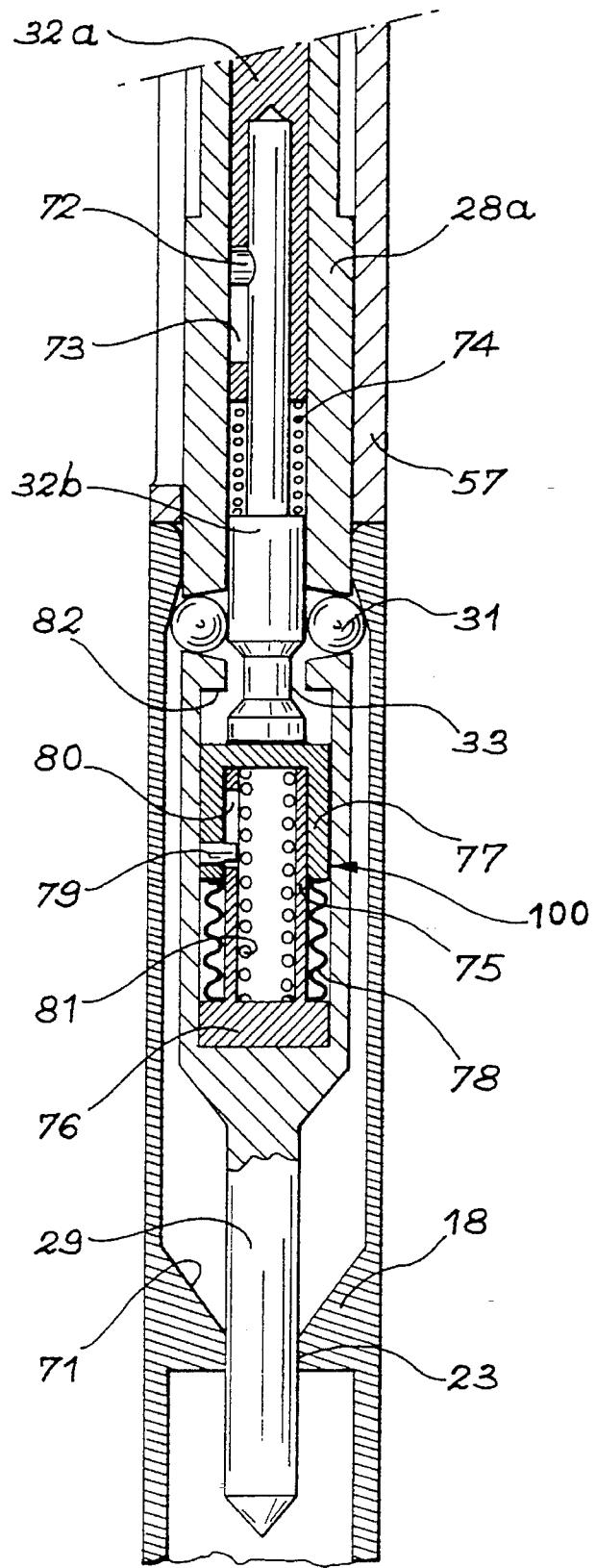

A second embodiment of the device according to the invention is shown in FIG. 6. It only differs from the first in that use is made of a locking member in two parts, together with a second, pressure-sensitive module. Thus, the locking member 32 is here constituted by two superimposed sections. The upper section 32a is connected to the thermal module and the locking groove 33 is machined in the bottom of the lower section 32b. The latter has in the upper portion a contraction engaged within an opening made within the upper section 32a. These two sections are interconnected with the possibility of a relative translational displacement equal to the unlocking travel of the ball link, by means of a stop pin 72 radially fixed to the lower section 32b and engaged in an axial opening 73 made in the upper section 32a. A fourth spring 74 is mounted on the contraction of the lower section 32b and tends to move apart the two sections.

A barometric module 100 is placed within the control rod sheath 28a beneath the lower section 32b of the locking member. This barometric module 100 is constituted by a central axial bush 75 coaxial to the control rod 5 and sealed in the lower portion by a base 76 and engaged in the upper portion in a cap 77. A metal bellows 78 is mounted on the axial bush 75 and tightly connects the base 67 of the bush 75 to the edge of the cap 77. The vacuum is formed in the interior of the barometric module 100. A guide and stop pin 79 is radially fixed to the cap 77 and engaged in an axial slot 80 machined in the axial bush 75. A fifth spring 81 is placed within the axial bush 75 and tends to raise the cap 77. The stiffness of the fifth spring 81 exceeds that of the fourth spring 74 and is less than that of the first and second springs 40, 44 of FIG. 2.

When the reactor is under full power, the temperature within the vessel reaches several hundred °C. and the pressure exceeds 100 bars. The position assumed by the components of the device according to the second embodiment is shown in FIG. 5. The pressure exerted on the barometric module 100 compresses the fifth spring 81 and maintains the module in the maximum shortening position, the bottom of the cap 77 bearing on the upper end of the tube 75.

The attachment finger 47 is in the projection position into the interior of the internal space of the control rod 5. The second spring (not shown in FIG. 6) exerts a downward pressure on the attachment head, which is transmitted by means of the thermal device, i.e. the bellows 35, to the upper section 32a of the locking member. This pressure compresses the fourth spring 74 until the upper end of the contraction of the lower section 32b is brought to the bottom of an opening of the upper section 32a. The lower section 32b has a solid portion facing the balls 31, which maintains the coupling.

If the temperature is lowered beyond said temperature for abutting the attachment finger against the cylinder shoulder, the upper section 32a of the locking member is raised by the thermal module, whereas the lower section 32b remains in engagement on the cap 77 and is maintained in this position by the pressure of the fourth spring 74.

Automatic uncoupling is obtained if the operating temperature is sufficiently low for the upper section 32a of the locking member to rise to a level equal to the unlocking travel and if the pressure is sufficiently decreased for the pressure permanently exerted by the fifth spring 81 on the cap 77 to become adequate to raise said cap 77 and the lower section 32b by a height equal to the unlocking travel. As a result the unlocking groove 33 faces the balls 31.

For example, unlocking can be obtained in this way when the temperature is lowered to 80° C. and the pressure to a few bars. When the unlocking travel has been covered, the cap 77 abuts at the top against a surface 82 in the control rod sheath 28a. The barometric module 100 is then in the maximum elongation position and a subsequent pressure drop has no effect on the locking member position.

Finally, if the seal of the metal bellows 78 of the barometric module 100 is broken and if that of the thermal module bellows 35 is maintained, uncoupling is obtained when the uncoupling temperature is reached.

If the seal of the thermal module is broken and that of the barometric module 100 maintained or if the seal of said two modules is lost, the lower section 32b of the locking member remains in the lower position when the uncoupling pressure and temperature are reached and coupling is maintained.

The special manipulating tool then makes it possible to obtain the uncoupling, the process being similar to that described during the description of the operation of the first embodiment of the device according to the invention. It is possible to raise the lower section 32b of the locking member by means of the pin 72.

In the same way, the recoupling and automatic uncoupling neutralization procedures remain unchanged compared with those described in connection with the first embodiment of the device according to the invention.

The invention is not limited to the embodiments described hereinbefore and has several variants.

Thus, it is possible to use other means for coupling the lower end of the control rod to the absorber cluster pommel. It is also possible to use other means for attaching the locking member to the control rod. The attachment means can also be carried by the control rod and not by the internal part thereof.

Finally, the device according to the invention is applicable not only to pressurized water nuclear reactors, but to any reactor type where the control takes place by translations of absorber elements within the core and where said control is ensured by mechanisms located outside the vessel and transmitted to the absorber elements by a vessel-traversing transmission member.

It is also possible to use the invention in nuclear installations, where use is made of an elongated vessel with an exceptionally long transmission member, e.g. to permit the installation within said vessel of a heat exchanger.

I claim:

1. Automatic uncoupling device between the pommel (18) of an absorber cluster (6) for introduction into the fuel elements (8) of the core (7) of a pressurized water nuclear reactor and a control rod (5) transmitting to the absorber cluster (6) movements induced by a control mechanism (4) located in a tight enclosure placed above the sealing cover (2) of the reactor vessel (1), said uncoupling device incorporating an attachment head (37), a mobile locking member (32), able to occupy a locked state and an unlocked state and whereof an axial displacement leads to a change of state, and a thermal module, characterized in that the thermal module deforms axially under the effect of the temperature and is placed between the attachment head (37) and the locking member (32) in order to form an assembly mobile in the axial direction and comprising a tight, water-filled bellows (35) and the attachment head (37) comprises at least one radial attachment finger (47) projecting by means of a small spring (48) and sliding within a cylinder (49) fitted in the sheath (28) of the control rod (5), said cylinder having an internal portion and from top to bottom a chamfered widening (53), as well as an axial notch (54) having a U-shaped section over part of its height, in order to receive the attachment finger (47), a second spring (44) placed above the attachment head (37) and tending to permanently push downwards so that the absorber cluster (6) is automatically uncoupled in the case of a reduction in the temperature of the water of the reactor vessel (1) below a first given temperature, the attachment finger (47) then abutting in the axial notch (54) and the locking member (32) rising under the effect of the shortening of the bellows (35), due to the contraction of the water to the upper position permitting the radial engagement of the balls (31) in the annular groove (30) of the locking member (32), the recoupling of the control rod (5) with the pommel (18) of the absorber cluster (6) taking place when a pressure is exerted on the top of the control rod (5), the latter firstly being downwardly displaced by a height equal to the axial portion (64a) of the slot (64) of the cylinder (49) and then, under the action of the helical portion (64b) of the slot (64) on the guide pin (51) rotating the cylinder (49) by a fraction of a turn freeing the attachment finger (47) from the U-shaped notch (54), thus permitting a downward displacement of the assembly of the attachment head (37) of the thermal module of the locking member (32).

2. Device according to claim 1, characterized in that the locking member (32) is a sliding, cylindrical member, fitted coaxially in the sheath (28) of the control rod (5), said locking member (32) having an annular locking groove (33) which can be located in front of the balls (31) placed in the sheath (28) of the control rod (5) when the locking member (32) is in an upper position, the balls (31) being received in radial, truncated cone-shaped recesses (30) in the bottom of the sheath (28), whose thickness is less than the diameter of the balls (31), said radial recesses (30) being shaped so as to prevent a radial, outwardly directed escape of the balls (31).

3. Device according to claim 1, characterized in that it comprises an extractor tube (57) mounted in sliding manner on the lower end of the sheath (28) and pushed downwards by a third spring (58) sufficiently stiff to raise the control rod (5), the extractor tube (57) having in its upper portion a slot (64) with an axial portion (64a) followed by a helical portion (64b) and which, by sliding on a guide pin (51) integral with the cylinder (49), guides the displacement of the cylinder (49).

4. Device according to claim 3, characterized in that the sheath (28) of the control rod (5) has, level with the guide pin (51), a horizontal slot (52) authorizing the rotation by a fraction of a turn of the cylinder (49) with respect to the control rod (5), thus permitting the freeing of the attachment finger (47) from the U-shaped, inner notch (54) and consequently the free, downward displacement of the attachment head (37).

5. Device according to claim 1, characterized in that it comprises a barometric module (100) positioned below the lower end of the locking member (32) and which is subdivided into two sections (32a, 32b) interconnected by a fourth spring (74), whose displacement is limited by a guide and stop pin system (79) and an axial slot (80), said barometric module (100) being maintained under vacuum and axially deforming as a function of the pressure variations prevailing in the reactor vessel (1) bringing about a change of state of the locking member (32).

6. Device according to claim 5, characterized in that the barometric module (100) is constituted by a lower base (76) surmounted by an axial bush (75), an upper cap (77) covering the axial bush (75), a metal bellows (78) tightly connecting the bush (75) and the cap (77) and a fifth spring (81) placed within the bush (75).

* * * * *

UNITED STATES PATENT AND TRADEMARK OFFICE
CERTIFICATE OF CORRECTION

PATENT NO. : 5,606,582
DATED : February 25, 1997
INVENTOR(S) : Bergamaschi

It is certified that error appears in the above-indentified patent and that said Letters Patent is hereby corrected as shown below:

On the title page, item [73], Assignee: the correct name of the Assignee is --Commissariat A L'Energie Atomique--.

Signed and Sealed this

Fourteenth Day of October, 1997

Attest:

BRUCE LEHMAN

Attesting Officer

Commissioner of Patents and Trademarks